United States Patent
Takatori

(10) Patent No.: US 6,173,120 B1
(45) Date of Patent: Jan. 9, 2001

(54) INSTANT PHOTO FILM PACK AND INSTANT CAMERA

(75) Inventor: Tetsuya Takatori, Kanagawa (JP)

(73) Assignee: Fuji Photo Film Co., Ltd., Kanagawa (JP)

(*) Notice: Under 35 U.S.C. 154(b), the term of this patent shall be extended for 0 days.

(21) Appl. No.: 09/377,737

(22) Filed: Aug. 20, 1999

(30) Foreign Application Priority Data

Sep. 7, 1998 (JP) .................................................. 10-252113

(51) Int. Cl.⁷ .................................................. G03D 17/50
(52) U.S. Cl. .................................................. 396/36
(58) Field of Search .............................. 396/33, 34, 517, 396/36, 518, 527; 206/455

(56) References Cited

U.S. PATENT DOCUMENTS 4,536,067 * 8/1985 Hara et al. ........................... 396/366

* cited by examiner

Primary Examiner—D. Rutledge
(74) Attorney, Agent, or Firm—Sughrue, Mion, Zinn, Macpeak & Seas, PLLC

(57) ABSTRACT

An instant photo film pack loadable in a camera includes a box-shaped pack and plural stacked self-developing photo film units of a mono-sheet type contained therein. The pack includes an upper wall having an exposure opening for providing the photo film units with an exposure, and a front wall having an exit slot for exiting the photo film units. The photo film units have a developing solution pod for containing developing solution along an advancing edge thereof. A bottom edge of each one of the photo film units is pushed by an ejecting claw after the exposure to advance the advancing edge through the exit slot. The each one photo film unit is contacted by a spreading control member while moved to a pair of spreader rollers. The instant photo film pack satisfies:

$$D \leq F$$

where D is a moving amount of the one photo film unit moving from the initial position to a position where the advancing edge of the one photo film unit contacts the spreading control member, and F is a distance between an inner edge of the exposure opening positioned in reverse to the advancing direction, and the bottom edge of the one photo film unit directly behind the exposure opening, the bottom edge being positioned in reverse to the advancing direction. Orientation of the bottom edge is stabilized while the one photo film unit directly behind the exposure opening is advanced.

16 Claims, 13 Drawing Sheets

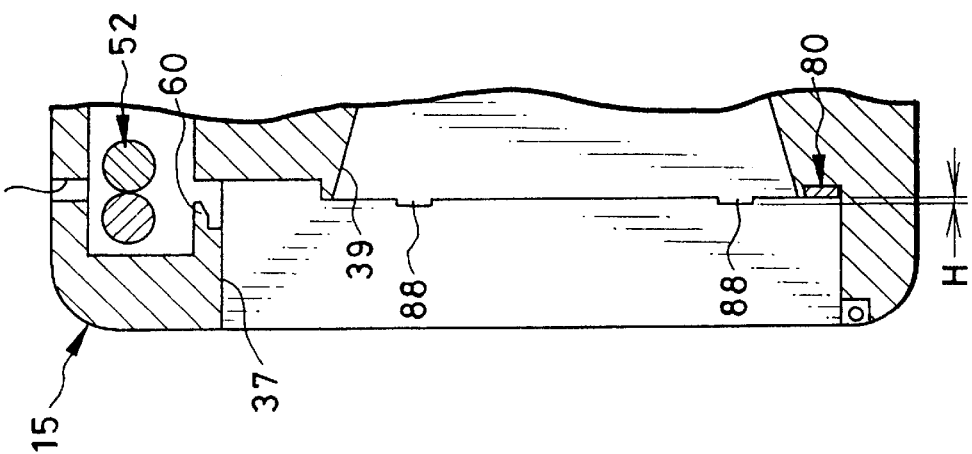
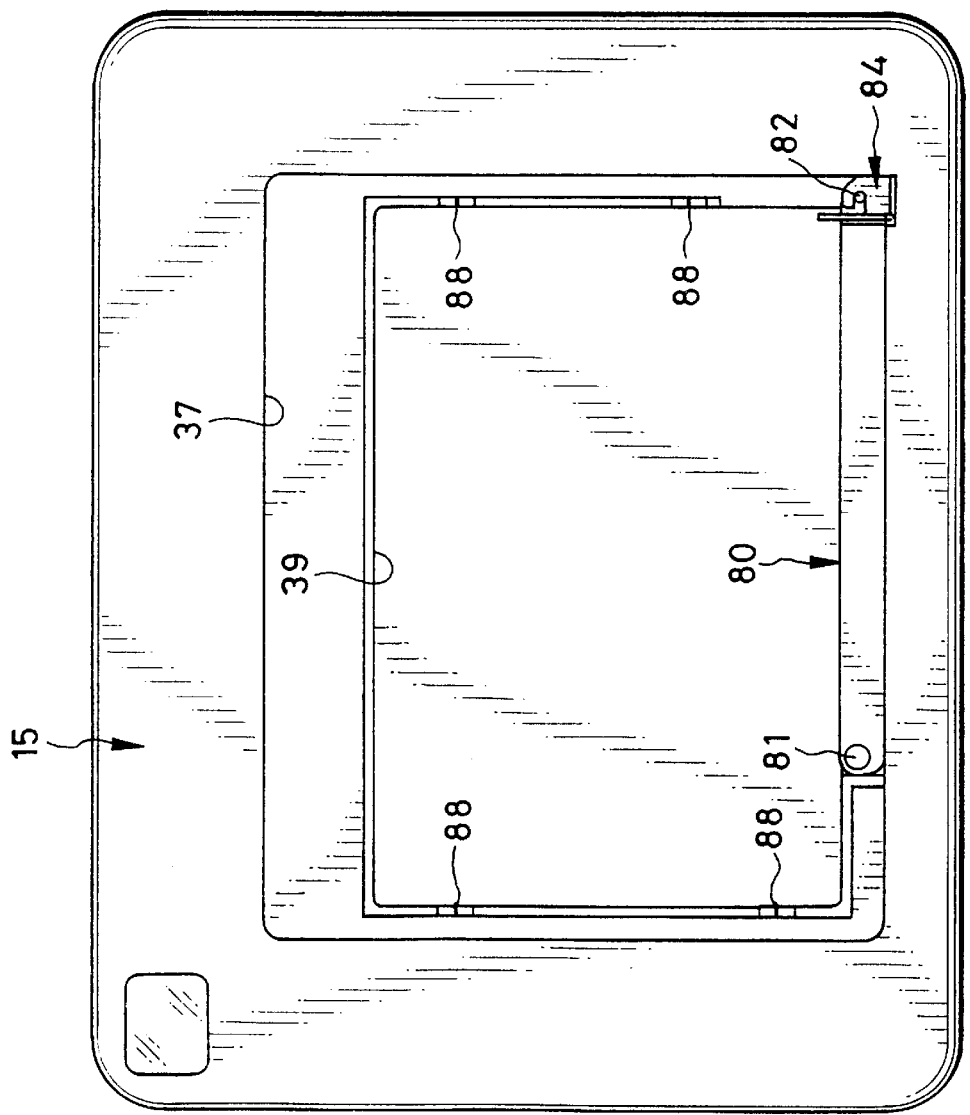

INSTANT PHOTO FILM PACK AND INSTANT CAMERA

BACKGROUND OF THE INVENTION

1. Field of the Invention

The present invention relates to an instant photo film pack and an instant camera. More particularly, the present invention relates to an instant photo film pack and an instant camera in which developing solution of self-developing photo film units can be caused to spread adequately.

2. Description Related to the Prior Art

There is an instant photo film pack 4 as illustrated in FIG. 13A. A case 2 of the instant photo film pack 4 in a box shape contains plural self-developing photo film units 3 of a mono-sheet type. The case 2 is formed from plastic material and provided with opacity and dark color for shielding light. An exposure opening 2a is formed in the front wall of the case 2, and opens for the exposure surface 3a of the photo film units 3. A top end wall is provided with an exit slot 2b for exiting the photo film units 3 to the outside of the case 2. The instant photo film pack 4 is for use with an instant camera, a printer and other optical instruments, and loaded in a pack chamber disposed in such optical instruments.

An advancing mechanism is incorporated in an optical instrument loadable with the instant photo film pack 4, for example an instant camera, for advancing an exposed one of the photo film units 3 out of the case 2 and for spreading developing solution. The advancing mechanism is constituted by a claw member 7 and a pair of spreader rollers 8. The claw member 7 moves upwards and enters a cutout 6 formed in the case 2, and advances the one photo film unit 3 through an exit slot formed in the top of the case 2. The spreader rollers 8 squeeze the one photo film unit 3 from the case 2 and rotate, so as to convey the one photo film unit 3 toward a camera exit slot, to spread developing solution to the photosensitive layer of the one photo film unit 3.

U.S. Pat. No. 4,226,519 discloses a spreading control member, which is disposed at an exit slot of a case for contacting an advancing photo film unit for the purpose of raising precision in spreading developing solution to a photosensitive layer by controlling distribution of the developing solution on the photosensitive layer. A commonly assigned patent application U.S. Ser. No. 09/258,258 (corresponding to Japanese Patent Application No. 10-53855) suggests a spreading control plate 10, disposed in an optical instrument loadable with the instant photo film pack 4, and arranged between the exit slot 2b of the case 2 and the spreader rollers 8.

The spreading control plate 10 being disposed above the spreader rollers 8, resistance against the passage of the one photo film unit 3 toward the spreader rollers 8 is increased in the course of contact of the one photo film unit with the spreading control plate 10. There occurs rotational moment with which the one photo film unit 3 starts rotating inside the case 2, because one bottom corner of the one photo film unit 3 is pushed by the claw member 7. Frictional resistance received by the one photo film unit 3 from the inside of the case 2 increases. It is likely that, in FIG. 13B, the one photo film unit 3 becomes curved convexly into the exposure opening 2a. If the one photo film unit 3 continues being advanced in such a curved state, a portion of the one photo film unit 3 pushed by the claw member 7 is pressed against the inside of the case 2. In FIG. 14, there occurs an undeveloped portion 3b of the one photo film unit 3 where developing solution fails to be spread.

The above problems are remarkable according to the horizontally extending shape of the photo film units 3, resistance applied to by the one photo film unit 3, and lowness in rigidity of photo film units. It is to be noted that the rigidity of the photo film units becomes low also when humidity changes.

SUMMARY OF THE INVENTION

In view of the foregoing problems, an object of the present invention is to provide an instant photo film pack and an instant camera in which developing solution of self-developing photo film units can be caused to spread adequately.

In order to achieve the above and other objects and advantages of this invention, an instant photo film pack is loadable in a camera, and includes a box-shaped pack and plural stacked self-developing photo film units of a mono-sheet type contained therein. The pack includes an upper wall having an exposure opening for providing the photo film units with an exposure, and a front wall having an exit slot for exiting the photo film units. The photo film units have a developing solution pod for containing developing solution along an advancing edge thereof. A bottom edge of each one of the photo film units is pushed by an ejecting mechanism after the exposure to advance the advancing edge through the exit slot. Each one photo film unit is contacted by a spreading control member while moved to a pair of spreader rollers. The developing solution pod is squeezed and torn upon passage between the spreader rollers to spread the developing solution in each one photo film unit. The instant photo film pack is characterized in that the bottom edge of each one photo film unit comes to the exposure opening later than the advancing edge comes in contact with the spreading control member upon pushing of each one photo film unit inside the pack, so that the bottom edge is prevented from being deformed in contact with the ejecting mechanism.

According to one aspect of the present invention, a combination of an instant photo film pack and an optical instrument usable therewith is provided. The instant photo film pack includes a case, having a substantially box shape, having a small thickness, and having first and second walls disposed opposite to each other, for containing a stack of plural self-developing photo film units of a mono-sheet type. An exposure opening is formed in the first wall, for providing one of the photo film units directly behind the first wall with an exposure. An exit slot is formed in an end wall of the case disposed between the first and second walls, for exiting the one photo film unit being exposed. The optical instrument includes a pack chamber loadable with the instant photo film pack. An exposure station is disposed in a front wall of the pack chamber, the instant photo film pack being set behind the exposure station, the exposure station causing recording light to become incident into the exposure opening. An advancing mechanism advances the one photo film units being exposed in an advancing direction out of the case, and spreads developing solution on the one photo film unit. A spreading control member frictionally pushes the one photo film unit while the one photo film unit moves to an outside of the exit slot, for controlling a spread state of the developing solution. The photo film units, the exposure opening and the spreading control member satisfy a condition of:

$$D \leq F$$

where D is a moving amount of the one photo film unit moving from the initial position to a position where the advancing edge of the one photo film unit contacts the spreading control member; and F is a distance between an inner edge of the exposure opening positioned in reverse to the advancing direction, and a bottom edge of the one photo film unit directly behind the exposure opening, the bottom edge being positioned in reverse to the advancing direction. Orientation of the bottom edge is stabilized while the one photo film unit directly behind the exposure opening is advanced in the advancing direction.

By this construction, the developing solution of the self-developing photo film units can be caused to spread adequately, because the edge of the one photo film unit positioned on a side upstream in the advancing direction is prevented from deformation.

In a preferred embodiment, the optical instrument is an instant camera, the exposure station has a light-shielding tunnel for introducing object light to the exposure opening.

The advancing mechanism includes a claw member, disposed in the pack chamber and close to a first corner of the exposure opening positioned in reverse to the advancing direction, extended to come through the first wall, for pushing the bottom edge in the advancing direction to move the one photo film unit. A pair of spreader rollers are positioned outside the pack chamber and in the advancing direction from the exit slot, for nipping and conveying the one photo film unit pushed by the claw member.

The photo film units respectively include an exposure surface and a back surface, and include an exposure region. A developing solution pod is disposed on the advancing edge, for containing the developing solution. A trapping portion is disposed on the bottom edge, for trapping a surplus part of the developing solution after being spread to the exposure region. The spreading control member includes a plate, positioned in the advancing direction from the pack chamber, for frictionally pressing the back surface of the one photo film unit.

The photo film units, the exposure opening and the spreading control member satisfy a condition of:

$$G \leq Y$$

where Y is a size of the photo film units in the advancing direction; and

G is a distance between the spreading control member and the inner edge of the exposure opening.

The photo film units and the exposure opening satisfy a condition of:

$$F \leq T$$

where T is a size of the trapping portion in the advancing direction.

A size of the photo film units in a direction perpendicular to the advancing direction is longer than a size of the photo film units in the advancing direction.

According to another aspect of the present intention, an instant camera includes an advancing mechanism for advancing the one photo film units being exposed in an advancing direction by moving from an initial position to an advanced position, to move the one photo film unit to an outside of the case, and spreads developing solution on the one photo film unit. A spreading control member frictionally pushes the one photo film unit while the one photo film unit moves to an outside of the exit slot, for controlling a spread state of the developing solution. A blocking mechanism is movable in response to movement of the advancing mechanism, positioned outside the exposure opening when the advancing mechanism is in the initial position, and positioned at least partially inside the exposure opening when the advancing mechanism is in the advanced position, for preventing a bottom edge of the one photo film unit from deformation to an inside of the exposure opening directly behind the exposure opening, the bottom edge being positioned in reverse to the advancing direction.

The advancing mechanism includes a claw member, disposed in the pack chamber and close to a first corner of the exposure opening positioned in reverse to the advancing direction, extended to come through the first wall, for pushing the bottom edge in the advancing direction to move the one photo film unit. The blocking mechanism includes a lever plate, extending from the claw member, opposed to the one photo film unit along the bottom edge, for preventing the bottom edge from flexing about the first corner.

The photo film units respectively include an exposure region. A developing solution pod is positioned in the advancing direction from the exposure region, for containing developing solution. A trapping portion is disposed on the bottom edge, for trapping a surplus part of the developing solution after being spread to the exposure region. The blocking mechanism contacts the trapping portion when the advancing mechanism is in the advanced position.

The lever plate has first and second ends and a middle portion therebetween, the first end being connected with the claw member, the second end being supported in the pack chamber in a rotatable manner, the middle portion being swung about the second end when the first end is driven by the claw member.

The lever plate has a lever rear face opposed to the instant photo film pack. Furthermore, plural pack support projections are disposed on a front inner face of the pack chamber and about the light-shielding tunnel, for projecting toward the instant photo film pack from the lever rear face, for positioning the instant photo film pack away from the lever plate.

The photo film units satisfy a condition of:

$$1.1 \leq X/Y \leq 2$$

where X is a size of the photo film units in a direction perpendicular to the advancing direction; and Y is a size of the photo film units in the advancing direction.

BRIEF DESCRIPTION OF THE DRAWINGS

The above objects and advantages of the present invention will become more apparent from the following detailed description when read in connection with the accompanying drawings, in which:

FIG. 11 is a rear elevation illustrating another preferred camera provided with pack support projections;

FIG. 12 is a cross section, partially cutaway, illustrating the camera;

DETAILED DESCRIPTION OF THE PREFERRED EMBODIMENT(S) OF THE PRESENT INVENTION

Figure 1:
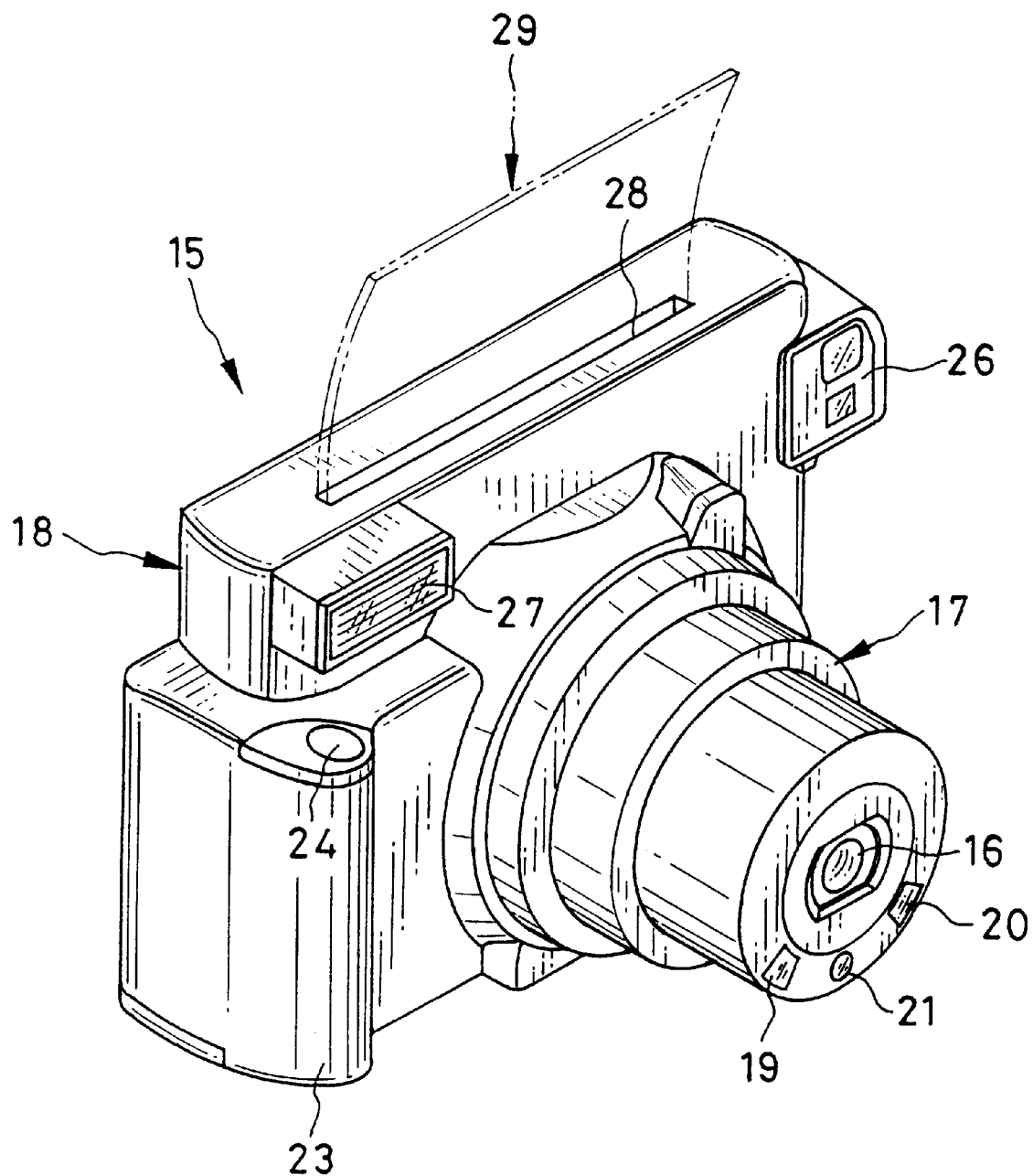
FIG. 1 is a perspective illustrating an instant camera.

In FIG. 1, an instant camera 15 for use with an instant photo film pack of the present invention is illustrated. The instant camera 15 has a substantially quadrilateral shape as viewed directly in a rearward direction. The instant camera 15 is loadable with an instant photo film pack containing plural self-developing photo film units, for example ten. A lens barrel 17 is disposed in the front of the instant camera 15, and incorporates a taking lens 16. The lens barrel 17 is movable between a first position protruded from a camera body 18 in a forward direction, and a second position retracted to the inside of the camera body 18, so that the instant camera 15 when not used has good portability. There is an auto-focusing mechanism of infrared active type. Also there are a projector window 19, a receiver window 20, a photometric window 21 in front of the lens barrel 17. The projector window 19 and the receiver window 20 constitute a rangefinding device. Light-projecting and light-receiving elements are disposed in positions inward from the projector window 19, the receiver window 20 and the photometric window 21.

A grip 23 is disposed on one lateral side of the instant camera 15. A shutter release button 24 is disposed on a top of the grip 23. The shutter release button 24 is depressible in two steps of different depths. When the shutter release button 24 is depressed halfway, photometric and rangefinding operation is effected to measurement of the object light and object distance. When the shutter release button 24 is fully depressed, a shutter device is released.

A user observes a field of view through a viewfinder 26, and depresses the shutter release button 24 in a halfway manner. Then the rangefinding and photometric operation is effected through the projector window 19, the receiver window 20 and the photometric window 21. Then the shutter release button 24 is depressed fully. A shutter device 30 in the lens barrel 17 is released according to rangefinding and photometric values as obtained. See FIG. 3. If brightness of a photographic subject is low, a flash emitter window 27 above the lens barrel 17 is operated automatically to emit flash light to the photographic subject. After an exposure is taken, an exposed one of self-developing photo film units 29 is advanced through a camera exit slot 28 in a top of the instant camera 15, and is developed.

Figure 2:
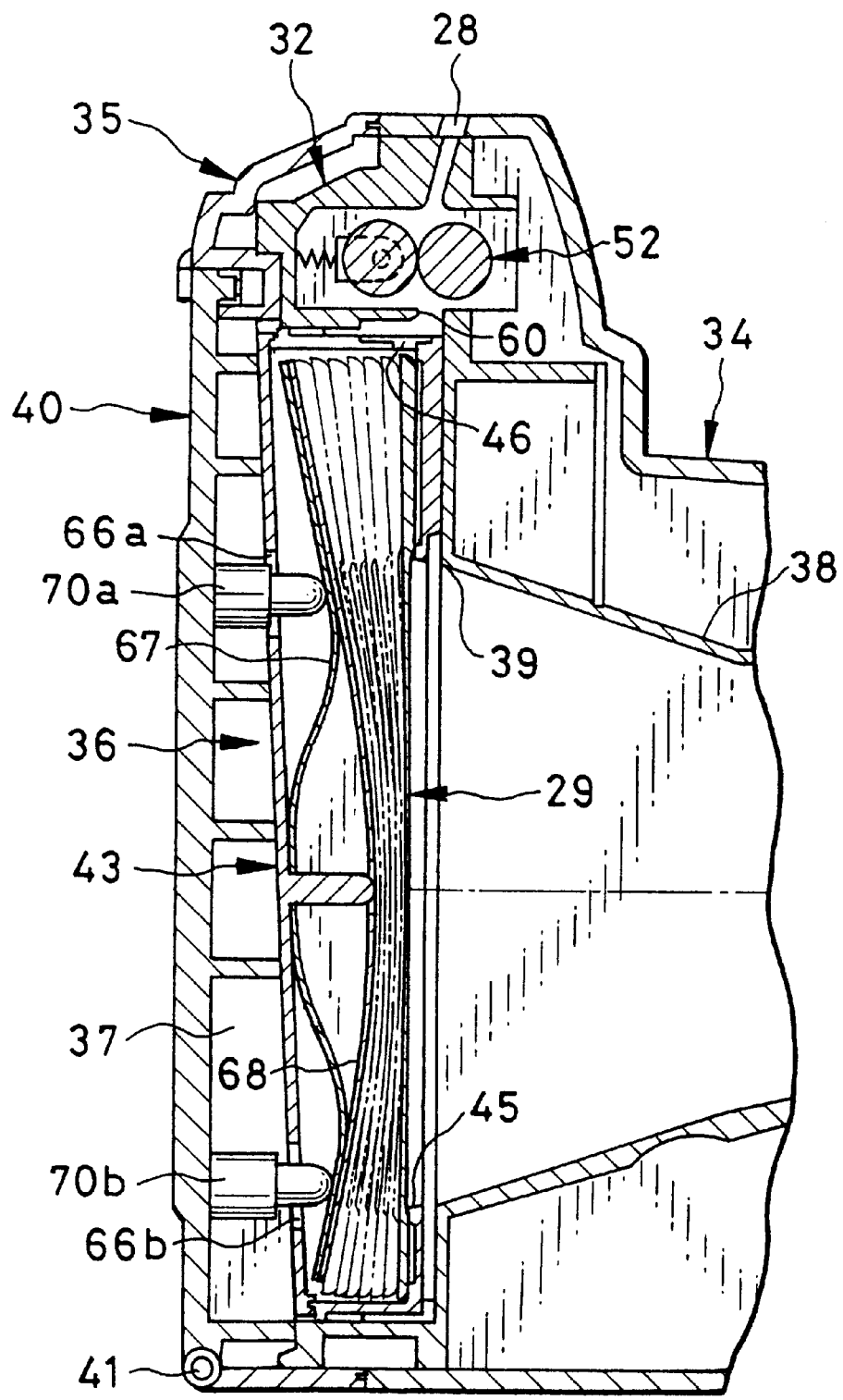
FIG. 2 is a cross section partially cutaway, illustrating a pack chamber of the instant camera loaded with an instant photo film pack.

In FIG. 2, the instant camera 15 is illustrated in section. The instant camera 15 is constituted by a base portion 32, a front cover 34 and a rear cover 35, both of which cover the base portion 32. The base portion 32 is provided with various parts for taking exposures. A pack chamber 37 is disposed in the rear of the base portion 32 for loading of an instant photo film pack 36. A light-shielding tunnel 38 is disposed to shield ambient light from photographic light path from the taking lens 16 to the instant photo film pack 36. An exposure aperture 39 is defined by the rear of the light-shielding tunnel 38 in the base portion 32 and located in front of the pack chamber 37. A back door 40 is secured to the rear cover 35 by use of a hinge 41 for closing the pack chamber 37.

Figure 3:
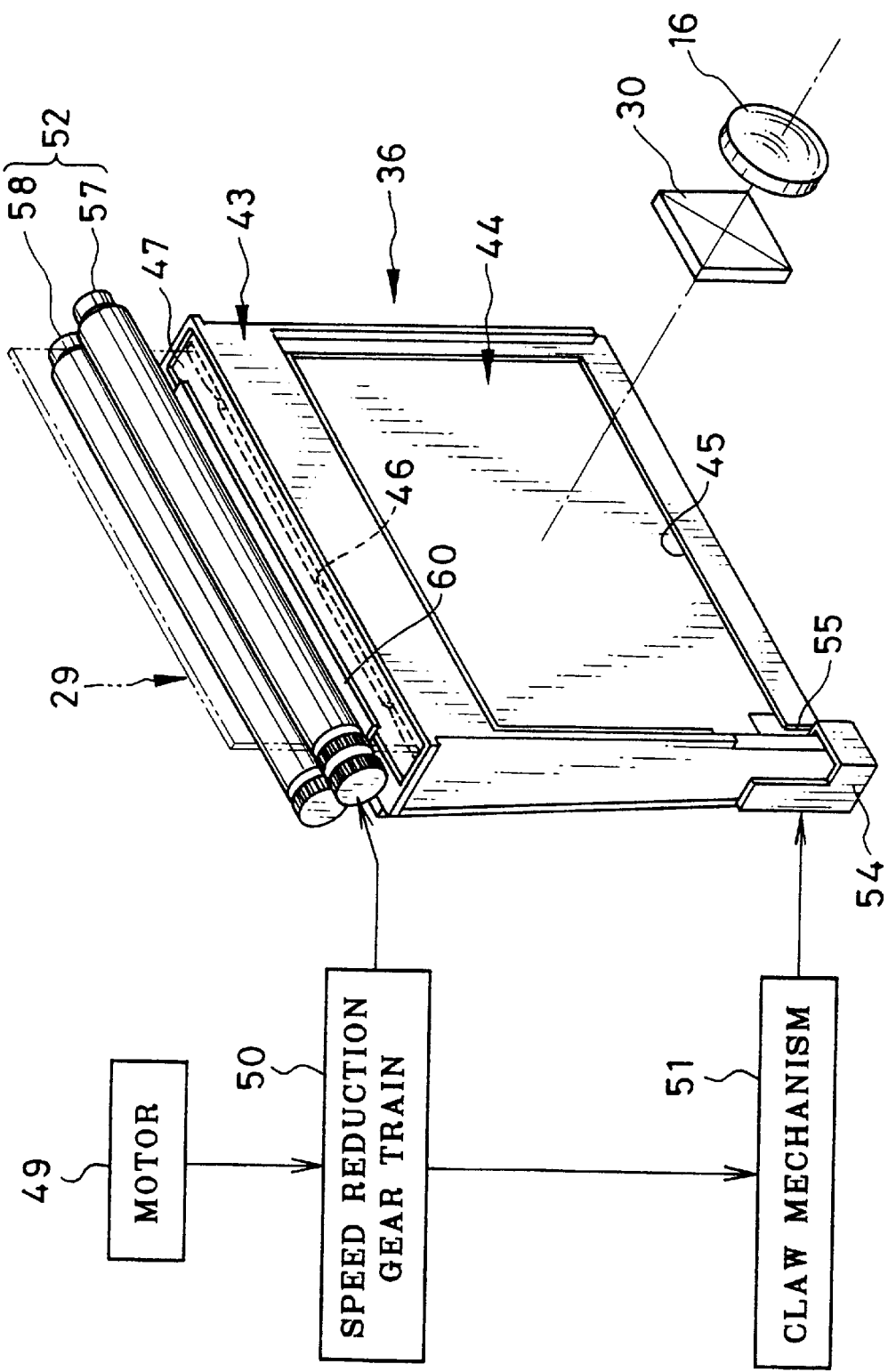
FIG. 3 is an explanatory view illustrating the photo film pak and relevant structures of the instant camera.

In FIGS. 2 and 3, the instant photo film pack 36 is constituted by a pack case or pack 43, and contains the photo film units 29 and a photo film cover 44. An exposure opening 45 is formed in the front wall of the pack 43, has a rectangular quadrilateral shape, and opens for the exposure surface of the photo film units 29. A top end wall is provided with an exit slot 46 for exiting the photo film cover 44 and the photo film units 29 to the outside of the pack 43. A light-shielding sheet 47 closes the exit slot 46 of the instant photo film pack 36 before being used. The exposure opening 45 is closed by the photo film cover 44 internally positioned in the pack 43.

When the pack chamber 37 is loaded with the instant photo film pack 36, the shutter device 30 and the taking lens 16 are located in front of the instant photo film pack 36. At each time that the shutter device 30 is released, one of the photo film units 29 is exposed behind the exposure opening 45. Also a photo film advancing mechanism is actuated for advancing the one photo film unit 29 in response to the releasing of the shutter device 30. The advancing mechanism includes a speed reduction gear train 50, a claw transmission mechanism 51, and spreader rollers 52 of an advancing mechanism. The speed reduction gear train 50 converts rotation of a motor 49 to rotation of a lower speed. The claw transmission mechanism 51 and the spreader rollers 52 are operated by driving operation of the speed reduction gear train 50.

The claw transmission mechanism 51 is driven by rotational movement of the motor 49 transmitted by the speed reduction gear train 50, to move in a vertically sliding manner, so that a claw member 54 of the advancing mechanism is moved vertically. A cutout 55 is formed in the pack 43 at one bottom corner of the exposure opening 45. The claw member 54 enters the cutout 55 upwards, and pushes up the photo film cover 44 or one of the photo film units 29 positioned directly behind the exposure opening 45, so as to advance it through the exit slot 46 toward the outside of the pack 43.

The spreader rollers 52 are constituted by a driving roller 57 and a driven roller 58. The driving roller 57 is caused by the motor 49 to rotate in the clockwise direction. The driven roller 58 is caused by the driving roller 57 to rotate in the counterclockwise direction. The spreader rollers 52 rotate while squeezing the photo film cover 44 or each of the photo film units 29 pushed by the claw member 54, to advance either of them up toward the camera exit slot 28 of the instant camera 15. The spreader rollers 52 cause development of each photo film unit 29 while advanced. There is a spreading control plate 60 disposed between the exit slot 46 of the instant photo film pack 36 and the spreader rollers 52, to ensure the development of each photo film unit 29.

Figure 4:
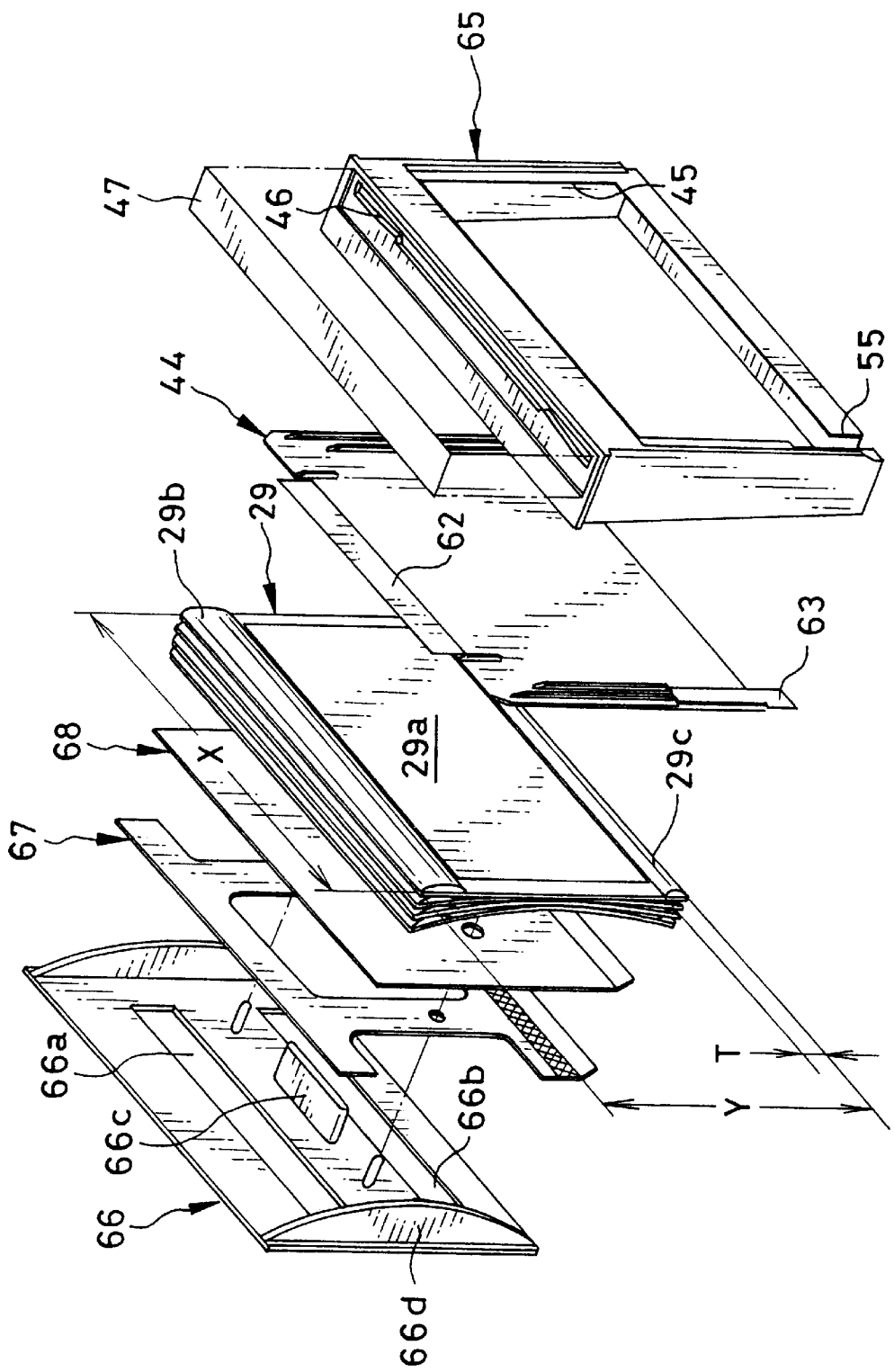
FIG. 4 is a exploded perspective illustrating the photo film pack.

In FIG. 4, the structure of the instant photo film pack 36 is illustrated. Each of the photo film units 29 includes an exposure surface or exposure region 29a, a developing solution pod 29b with an advancing edge, and a trapping portion 29c with a bottom edge. The exposure surface 29a is photosensitive and records an image by means of a camera or a printer. The solution pod 29b encloses developing solution. The photo film units 29 are a mono-sheet type which can be treated as a single sheet even in the unused state and also in the finished state with a positive image. Furthermore, the photo film units 29 are a transmission type, in which the surface to be exposed is different from a surface where the positive image is created. Consequently a back surface reverse to the exposure surface 29a consists of a positive image creating surface.

When the exposure surface 29a is exposed, the photo film units 29 are advanced to the outside of the pack 43 by the claw transmission mechanism 51 and the claw member 54. The portion of the photo film units 29 moving away from the pack 43 is squeezed by the spreader rollers 52 and further moved to the outside of the instant camera. Also the spreader rollers 52 push open the solution pod 29b. An image receiving layer, a photosensitive layer and a reflection layer are disposed between the exposure surface 29a and the positive image creating surface. The developing solution flows out of the solution pod 29b, and is spread between the photosensitive layer and the exposure surface 29a. A latent image is photochemically created on the photosensitive layer, and transferred to the image receiving layer via the reflection layer. Then a positive image is created on the positive image creating surface by inversion of the exposed image.

The spreading control plate 60 rubs the positive image creating surface of the photo film units 29, to help the developing solution be spread in a regularized manner for the purpose of producing a photographic print with a high quality. Surplus part of the solution is sent to the trapping portion 29c. The trapping portion 29c contains a pad produced from material of good absorption. The surplus solution is absorbed by the pad and hardened. Note that the pack 43 of the instant photo film pack 36, though not depicted, contains the ten photo film units 29. Only one of the photo film units 29 is illustrated for the purpose of simplification of the drawing.

The photo film cover 44 is a thin sheet or plate formed from plastic material with opacity and dark color to shield light. The photo film cover 44 is thinner than the solution pod 29b of the photo film units 29, and thus does not apply load to the advancing mechanism when advanced. A front light-shielding flap 62 is secured to an edge of the photo film cover 44 opposed to the exit slot 46 of the pack 43, and is a thin sheet or plate formed from plastic material with opacity and dark color to shield light. The front light-shielding flap 62 is flexed inside the pack 43 toward the photo film units 29, closes the center of the exit slot 46, and prevents the photo film cover 44 or the photo film units 29 from slipping out of the exit slot 46 even when the instant photo film pack 36 is dropped abruptly with a shock. A rear light-shielding flap 63 is secured to a rear corner of the photo film cover 44 inside the pack 43 to close the cutout 55.

The pack 43 is constituted by a case body 65 having a first wall, a second wall 66 or a back lid, a first resilient sheet 67 and a second resilient sheet 68. The case body 65 as a box shape. The second wall 66 is secured to the case body 65 and closes the open rear of the case body 65. The first and second resilient sheets 67 and 68 are secured to the inside of the second wall 66. As referred to above, the exposure opening 45 and the cutout 55 are located on the case body 65 disposed in the front. The exit slot 46 is located in the top of the case body 65.

There are openings 66a and 66b of a long quadrilateral shape and extending in the horizontal direction. The instant camera has push pads 70a and 70b disposed on the inside of the back door 40, to be inserted into the openings 66a and 66b. Details of structure of the push pads 70a and 70b are disclosed in U.S. Pat. No. 5,541,683 (corresponding to JP-A 7-244336). The push pads 70a and 70b enter the pack 43, and push the back surface of the photo film units 29, so as to flatten the one of the photo film units 29 directly behind the exposure opening 45.

There are a support projection 66c and arc-shaped support ridges 66d on the inside of the second wall 66 for pushing the photo film units 29 toward the exposure opening 45. The support projection 66c and the support ridges 66d operate for the purpose of avoiding inadvertent movement of the photo film units 29 inside the pack 43 and avoiding occurrence of a space between the exposure opening 45 and the photo film cover 44. In the photo film units 29, the solution pod 29b and the trapping portion 29c have a greater thickness than the middle portion having the exposure surface 29a, so the stack of the photo film units 29 inevitably has a considerable difference in the thickness between the two horizontal edges and the middle portion. However the support ridges 66d have the arc shape exactly associated with the shape of the stack of the photo film units 29, and thus can push the photo film units 29 appropriately to shield the inside of the pack 43 from ambient light. The support projection 66 c supports the middle portion of the rearmost one of the photo film units 29, to avoid occurrence of a curl or bending of the middle portion by avoiding flexing of the middle portion in reverse to the projecting direction of the support projection 66c.

The first resilient sheet 67 is retained on the second wall 66. One portion of the second resilient sheet 68 is attached to the first resilient sheet 67. When the instant photo film pack 36 is unused, the first and second resilient sheets 67 and 68 close the openings 66a and 66b of the second wall 66. When the push pads 70a and 70b are inserted into the openings 66a and 66b by loading the camera with the instant photo film pack 36, the first and second resilient sheets 67 and 68 are pushed by the push pads 70a and 70b to press the stack of the photo film units 29, to keep flat the one of the photo film units 29 directly behind the exposure opening 45.

Figures 5A, 5B:
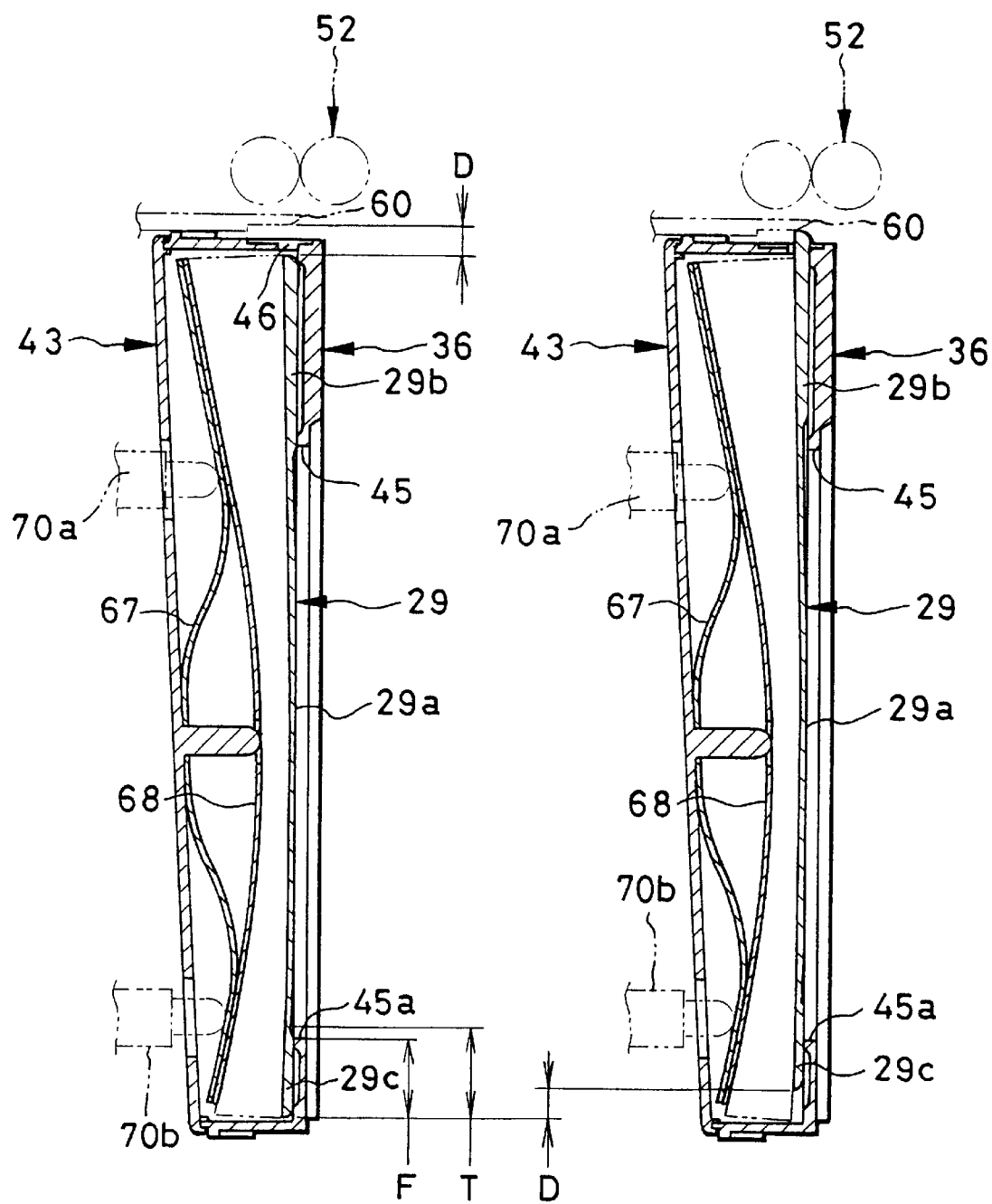
FIG. 5A is a vertical section illustrating a state of the photo film pack where photo film units are fully contained.
FIG. 5B is a vertical section illustrating a state of the photo film pack where a first photo film units is being advanced.

In FIG. 5A, one of the photo film units 29 directly behind the exposure opening 45 is in an initial position inside the pack 43 of the instant photo film pack 36. In FIG. 5B, the one of the photo film units 29 directly behind the exposure opening 45 is advanced by the claw member 54 to the outside of the pack 43 and becomes contacted by the spreading control plate 60. In the present invention, the instant photo film pack 36 satisfies the condition of:

$$D \leq F$$

where D is a moving amount of the one photo film unit 29 moving from the initial position to a position where the advancing edge of the one photo film unit 29 contacts the spreading control plate 60, and F is a distance of the bottom edge of the one photo film unit 29 to an inner lower edge of the exposure opening 45. Therefore the bottom edge of the one photo film unit 29 is prevented by the inner wall of the pack 43 from flexing in the direction projecting into the exposure opening 45 even when the advancing edge of the one photo film unit 29 receives great resistance from the spreading control plate 60 in contact therewith. The bottom edge of the one photo film unit 29 can be safely conveyed toward the spreader rollers 52 in a flattened manner. No undeveloped portion occurs, because the developing solution can be spread in an overall reliable manner.

A region of contact of the bottom edge of the one photo film unit 29 with the inner face of the pack 43 can be large according to greatness in the difference F–D, namely a difference between the distance F from the bottom edge of the photo film unit 29 to the lower inside edge of the exposure opening 45 and the moving distance D of the photo film unit 29. The advance of the photo film unit 29 can be stabilized. However the lower limit of the effective exposure region of the photo film unit 29 is restricted by the trapping portion 29c. Should the distance F be too great, the effective exposure region may be blocked by the lower inside edge of the exposure opening 45. Accordingly the instant photo film pack 36 is structured to satisfy the condition of:

$$F \leq T$$

where T is a size of the trapping portion 29c in the advancing direction.

The operation of the above construction is described now. In FIG. 3, the instant photo film pack 36 before use has the photo film cover 44 which closes the exposure opening 45 formed in the pack 43. The exit slot 46 in the top of the instant photo film pack 36 is closed by the light-shielding sheet 47 attached thereto. In FIG. 4, the cutout 55 in connection with the exposure opening 45 is closed by the rear light-shielding flap 63 attached to the photo film cover 44.

The instant photo film pack 36 is inserted into the pack chamber 37 of the instant camera 15, before the back door 40 is closed. In FIG. 2, the push pads 70a and 70b on the inside of the back door 40 are entered in the openings 66a and 66b in the pack 43, to push the stack of the photo film units 29 indirectly with the first and second resilient sheets 67 and 68, to flatten the one of the photo film units 29 directly behind the exposure opening 45.

After the pack chamber 37 is loaded with the instant photo film pack 36, a user depresses the shutter release button 24 for one time to discharge the photo film cover 44. It is to be noted that the camera may be provided with an automatic construction for discharging the photo film cover 44 in response to closing movement of the back door 40.

After advance of the photo film cover 44, a first one of the photo film units 29 is set behind the exposure opening 45. See FIG. 5A. A field of view to be photographed is observed through the viewfinder 26, before the shutter release button 24 is depressed. The shutter device 30 is actuated to take an exposure on the exposure surface 29a of the first photo film unit 29. Upon a finish of releasing the shutter device 30, the advancing mechanism incorporated in the instant camera 15 starts its operation.

When the motor 49 for the advancing mechanism starts rotating, the rotation of the motor 49 is converted by the speed reduction gear train 50 into rotation at reduced speed, so that the claw transmission mechanism 51 is driven. The claw transmission mechanism 51 converts the rotation into vertical sliding movement, to cause the claw member 54 to slide up and down for one time. The claw member 54 enters the cutout 55 upwards, and contacts the bottom edge of the one photo film unit 29 at one corner, and pushes it up. The one photo film unit 29 is moved inside the pack 43, and exited from the exit slot 46 to the outside of the pack 43.

Figure 13A:
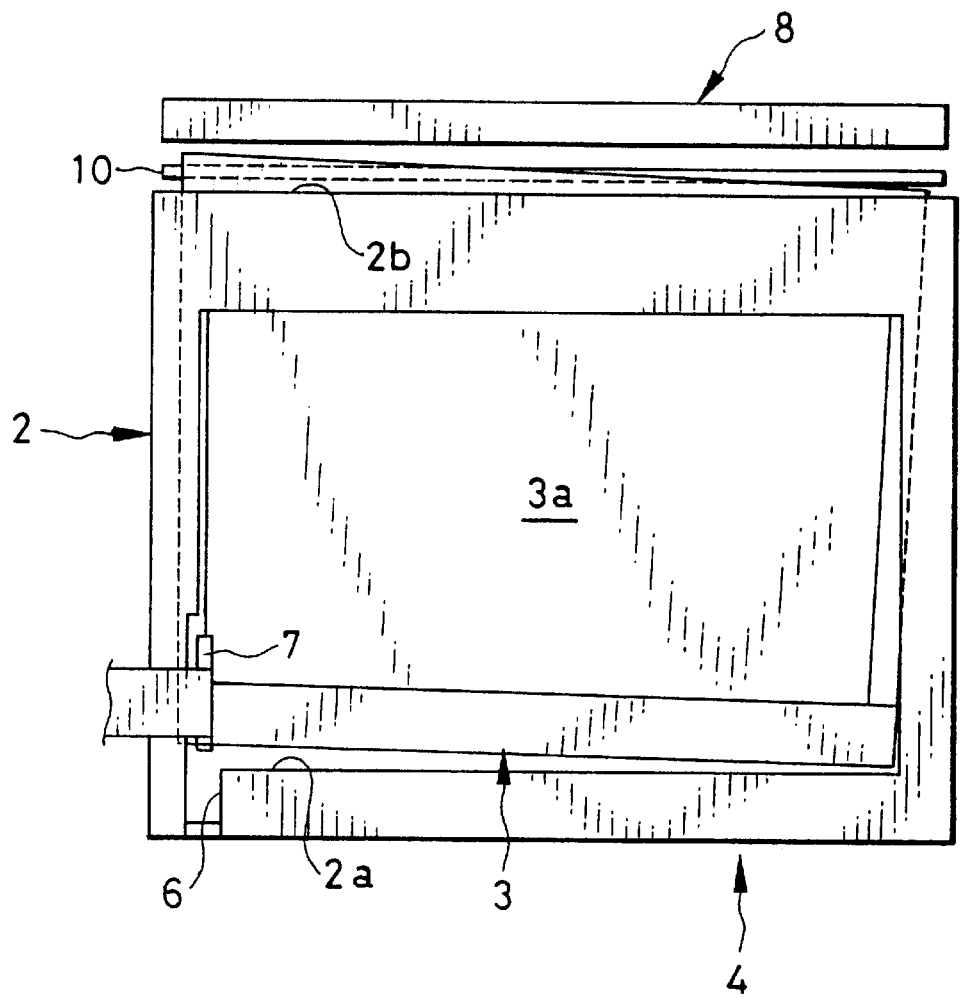
FIG. 13A is a front elevation illustrating a camera of the prior art.
Figure 13B:
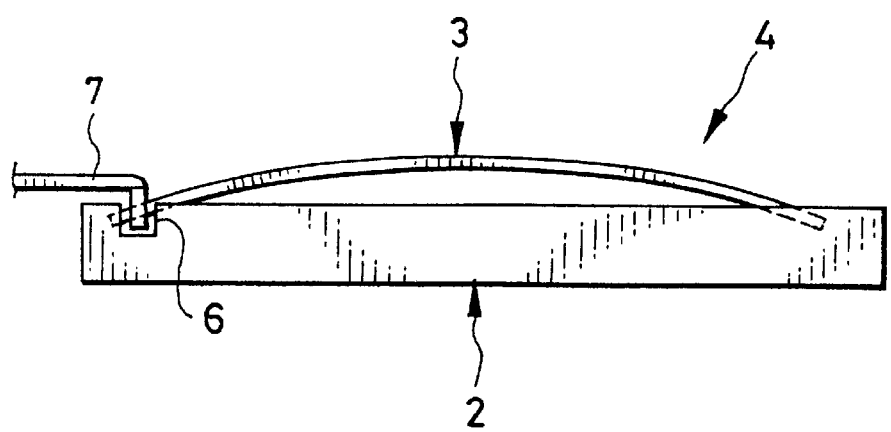
FIG. 13B is a bottom plan illustrating a curved state of a photo film unit according to the prior art.
Figure 14:
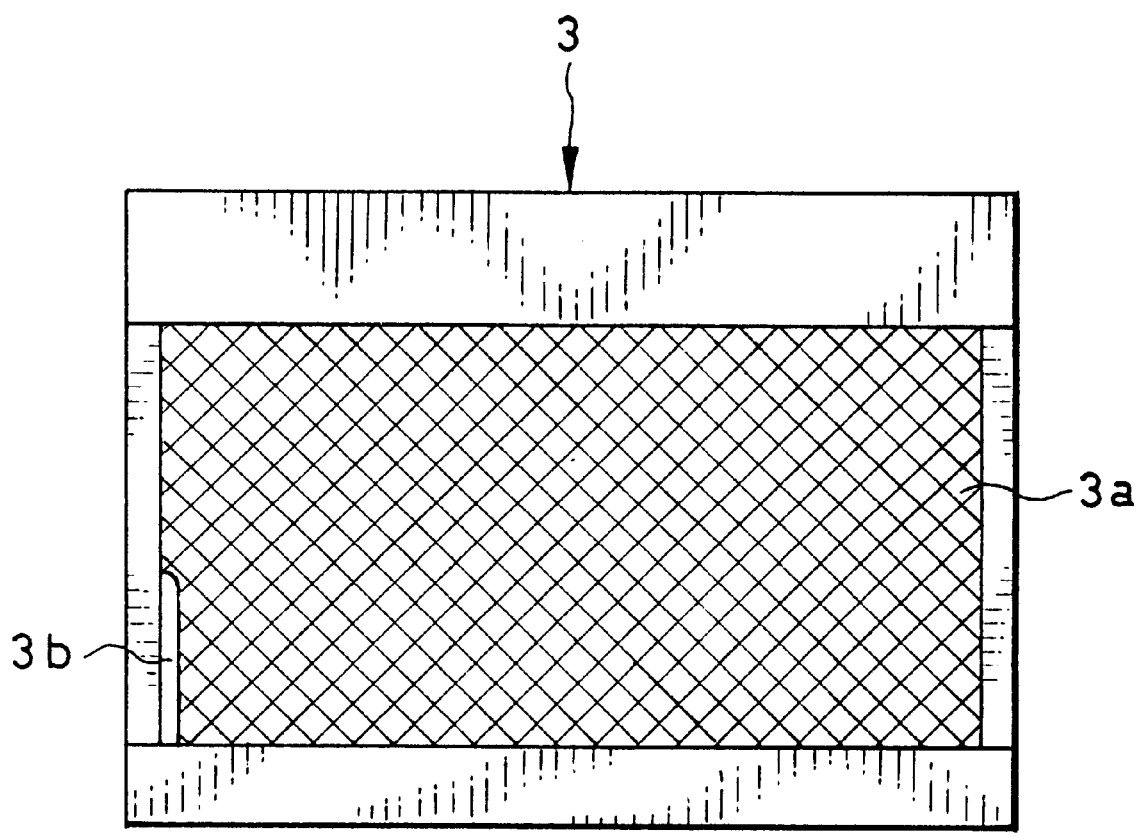
FIG. 14 is an explanatory in plan illustrating a state of developing a photo film unit according to the prior art.

The one photo film unit 29 advanced to the outside of the pack 43 comes in contact with the spreading control plate 60 as illustrated in FIG. 5B. While the one photo film unit 29 contacts the spreading control plate 60, load applied to the one photo film unit 29 during the passage is increased. There occurs rotational moment with which the one photo film unit 29 starts rotating inside the pack 43. However the bottom edge of the one photo film unit 29 still remains contacted by the lower inside face of the pack 43. There does not occur protrusion of the bottom edge of the photo film unit through the exposure opening in the manner of the photo film pack 4 according to the prior art of FIGS. 13A and 13B. Thus the one photo film unit 29 can be advanced to the spreader rollers 52.

The solution pod 29b is torn open by the spreader rollers 52 when squeezed. The developing solution from the solution pod 29b is spread between the photosensitive layer and the exposure surface 29a. The spreading control plate 60 spreads the developing solution in a regularized manner by pressing the one photo film unit 29. Then the one photo film unit 29 is exited from the camera exit slot 28 of the instant camera 15. Upon a lapse of a predetermined duration, a positive image appears on the positive image creating surface.

EXAMPLES

Oblique advance of the photo film units 29 is the more likely to occur according to a horizontally long extent of the format of the photo film units 29. Effects of the above embodiments can be obtained particularly when $$1.1 \leq X/Y$$

in FIG. 4, where X is a horizontal size of the photo film units 29, and Y is a vertical size of the photo film units 29. Preferable sizes of various portions of the instant photo film pack 36 are indicated below:

|        | Preferable sizes | More preferable sizes |
|--------|------------------|------------------------|
| X/Y    | 1.1–2            | 1.2–1.5                |
| T (mm) | 4–10             | 5–8.5                  |
| F (mm) | 3.5–9.5          | 4.5–7                  |
| D (mm) | 1–9              | 2–8                    |

In the above embodiments, the photo film pack is structured for the purpose of stabilizing the advance of photo film units. Alternatively, an instant camera can be structured for the same purpose. A preferred embodiment for such a structure is described now. Elements similar to those of the above embodiments are designated with identical numeral.

Figure 6A:
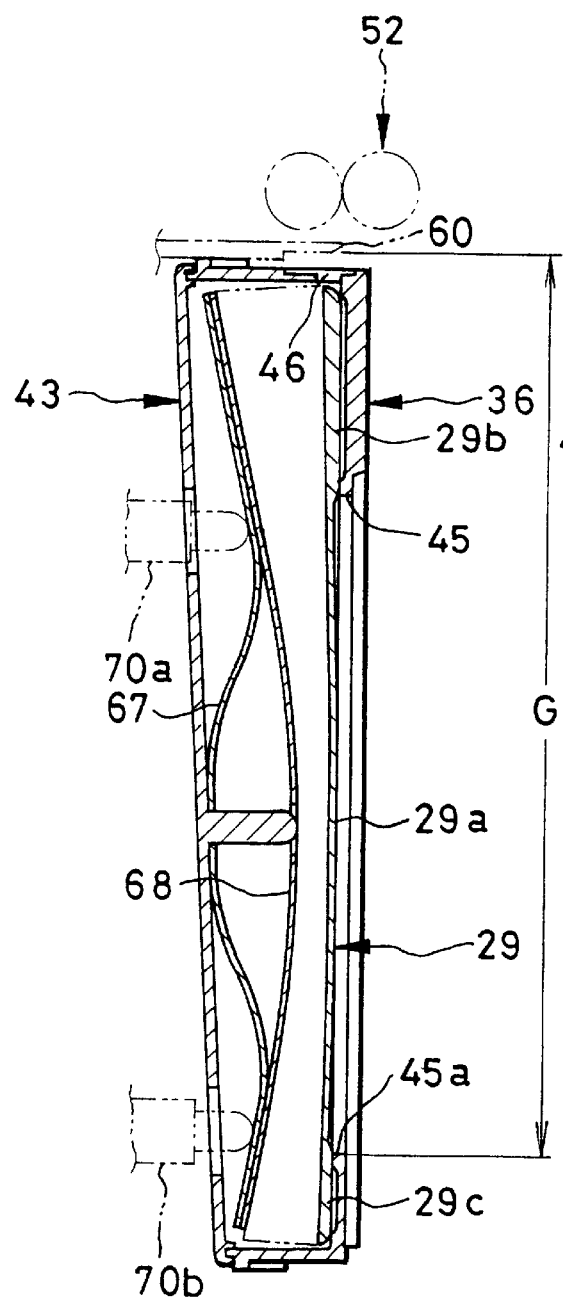
FIG. 6A is a vertical section illustrating another preferred embodiment in a state where photo film units in a photo film pack are fully contained.
Figure 6B:
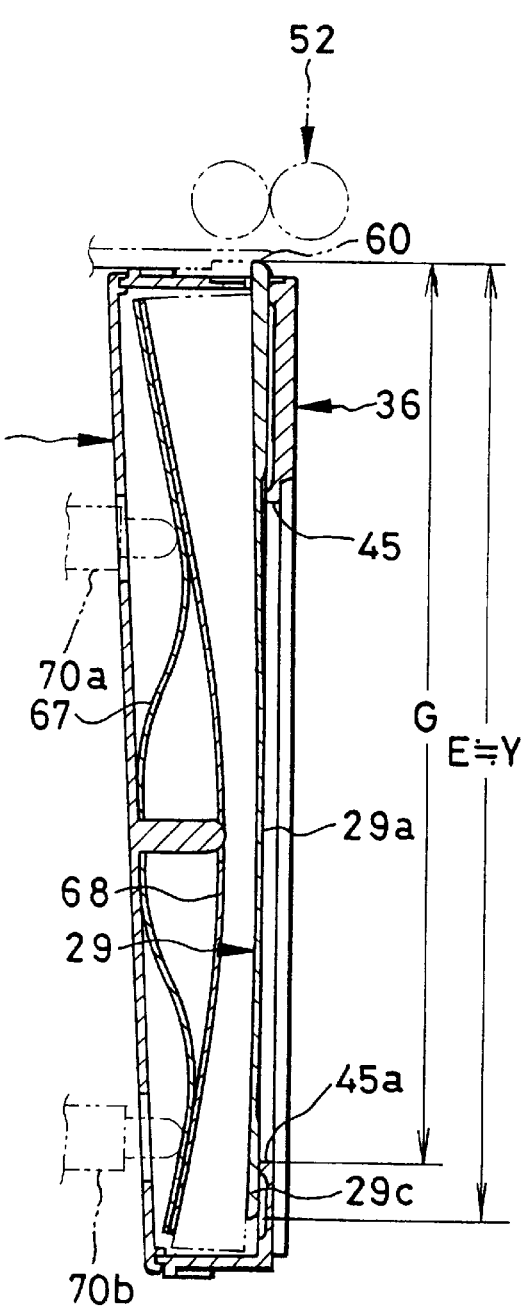
FIG. 6B is a vertical section illustrating a state of the photo film pack where a first photo film units is being advanced.

In FIG. 6A, the instant photo film pack 36 is positioned in the pack chamber 37 by keeping G constant, where G is a distance from the spreading control plate 60 to an inner edge 45a of the exposure opening 45 of the instant photo film pack 36. In FIG. 6B, the distance G is determined to satisfy a condition of:

$$G \leq E$$

where E is a distance from the spreading control plate 60 to the bottom edge of the one photo film unit 29 when the one photo film unit 29 contacts the spreading control plate 60. On the other hand, the distance E satisfies E=Y, where Y is a size of the photo film unit 29 as measured in the advancing direction. Therefore, the instant camera 15 satisfies the condition $$G \leq Y.$$

By this construction, the bottom edge of the one photo film unit 29 can be kept in contact with the inner inside face of the pack 43 when the top edge of the one photo film unit 29 contacts the spreading control plate 60. The one photo film unit 29 can be advanced unfailingly in a similar manner to the above embodiment.

In the above embodiments, the sizes related to the photo film pack and the camera are appropriately determined. Furthermore, a blocking mechanism can be structured for avoiding deformation of a bottom edge of the one photo film unit being advanced. A preferred embodiment with the blocking mechanism is described now. Elements similar to those of the above embodiment are designated with identical reference numerals.

Figure 7A:
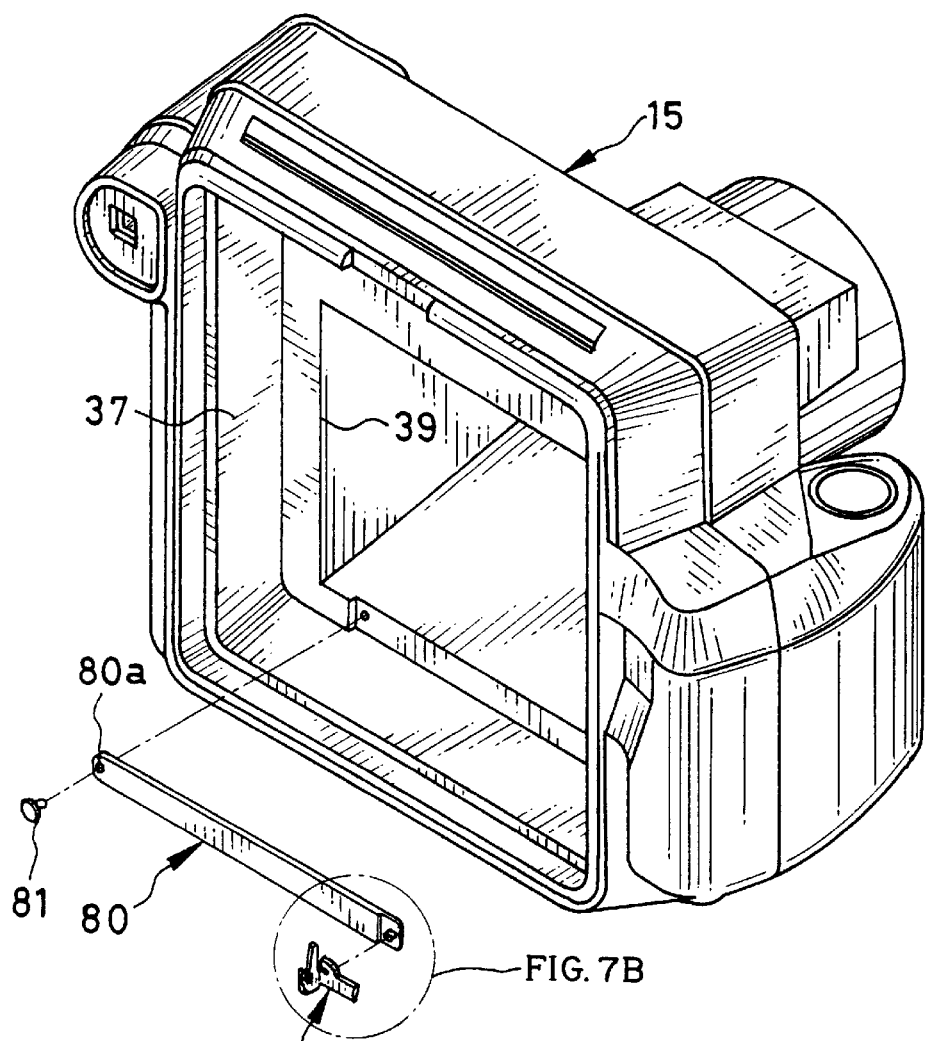
FIG. 7 is a perspective illustrating still another preferred instant camera provided with a blocking lever plate.
Figure 7B:
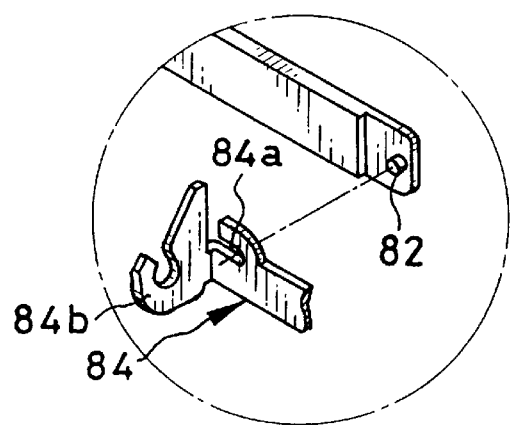

In FIG. 7, a blocking lever plate 80 of a long shape as a blocking mechanism is disposed in the pack chamber 37 loadable with the instant photo film pack 36. The blocking lever plate 80 has an end hole 80a formed at a second end. A screw 81 is inserted in the end hole 80a, and fastened to an inside face under the exposure aperture 39 to support the blocking lever plate 80 pivotally. The blocking lever plate 80 is provided with an end pin 82, disposed at a first end and erectly to the rear of the instant camera 15. The first end of the blocking lever plate 80 has a small thickness. A claw member 84 of the advancing mechanism is slid by the claw transmission mechanism 51 in the vertical direction, and is provided with a slit 84a, in which the end pin 82 of the blocking lever plate 80 is inserted. A claw projection 84b is formed with the claw member 84, for entering the instant photo film pack 36 to push the bottom edge of the photo film cover 44 or the one photo film unit 29.

The screw 81 is disposed in a direction opposite to the claw member 84 with reference to a center line in an advancing direction of the photo film units 29.

Figure 8A:
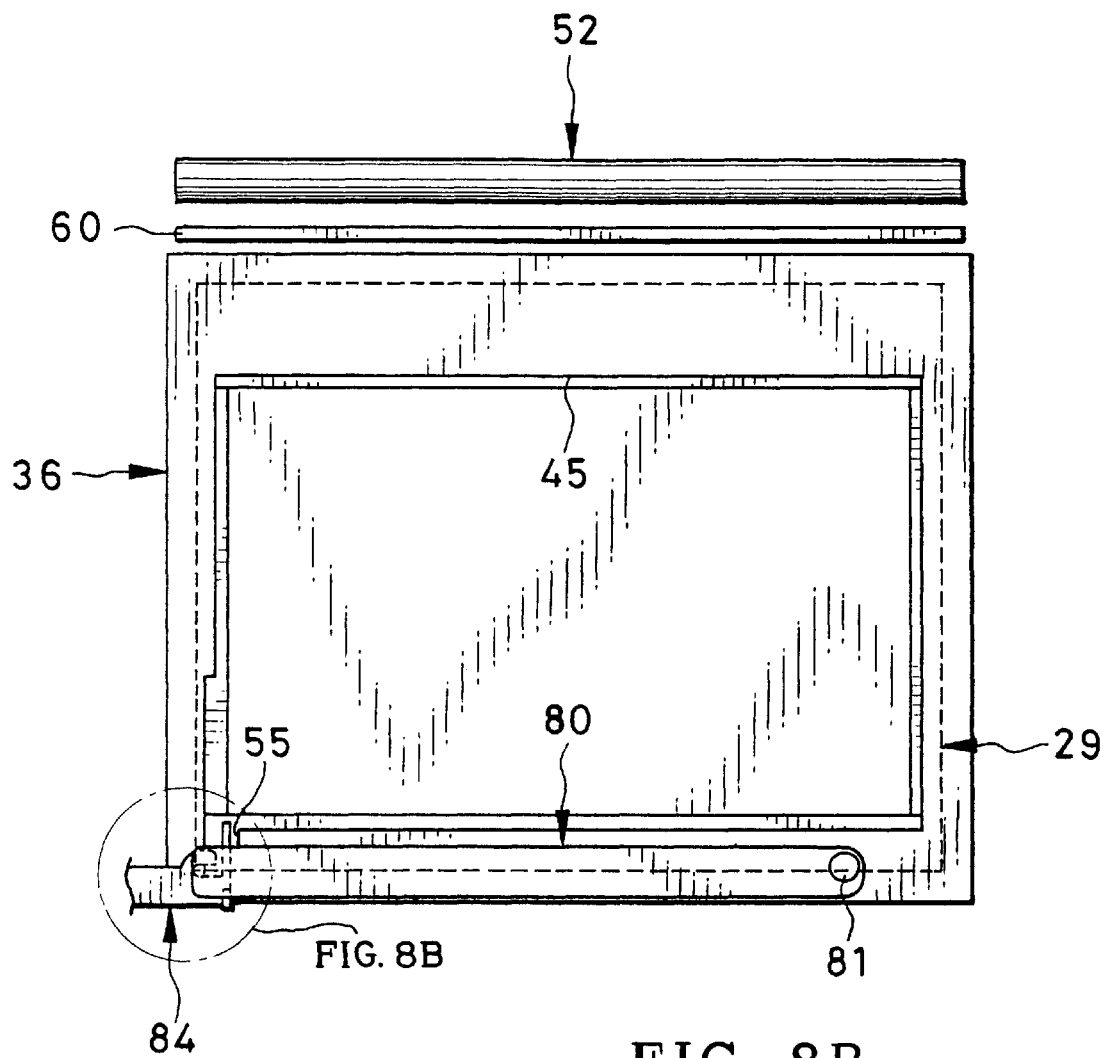
FIG. 8 is an explanatory view in front elevation, illustrating the instant camera.
Figure 8B:
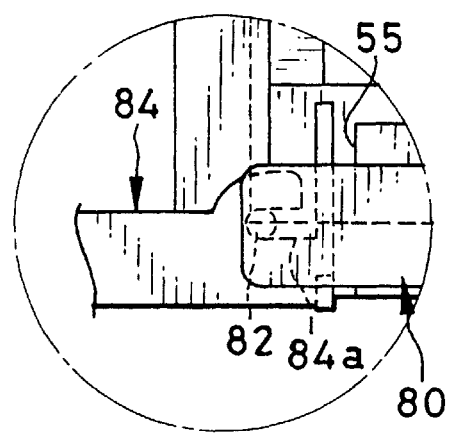

In FIG. 8, the instant photo film pack 36 in the pack chamber 37 is viewed from the side of the taking lens 16. When the claw member 84 remains shifted under the instant photo film pack 36 during an exposure to the one photo film unit 29 without operation of the advancing mechanism, the blocking lever plate 80 is disposed outside the exposure opening 45 in the instant photo film pack 36. The blocking lever plate 80 does not block object light to the one photo film unit 29 while the one photo film unit 29 is provided with an exposure.

Figure 9A:
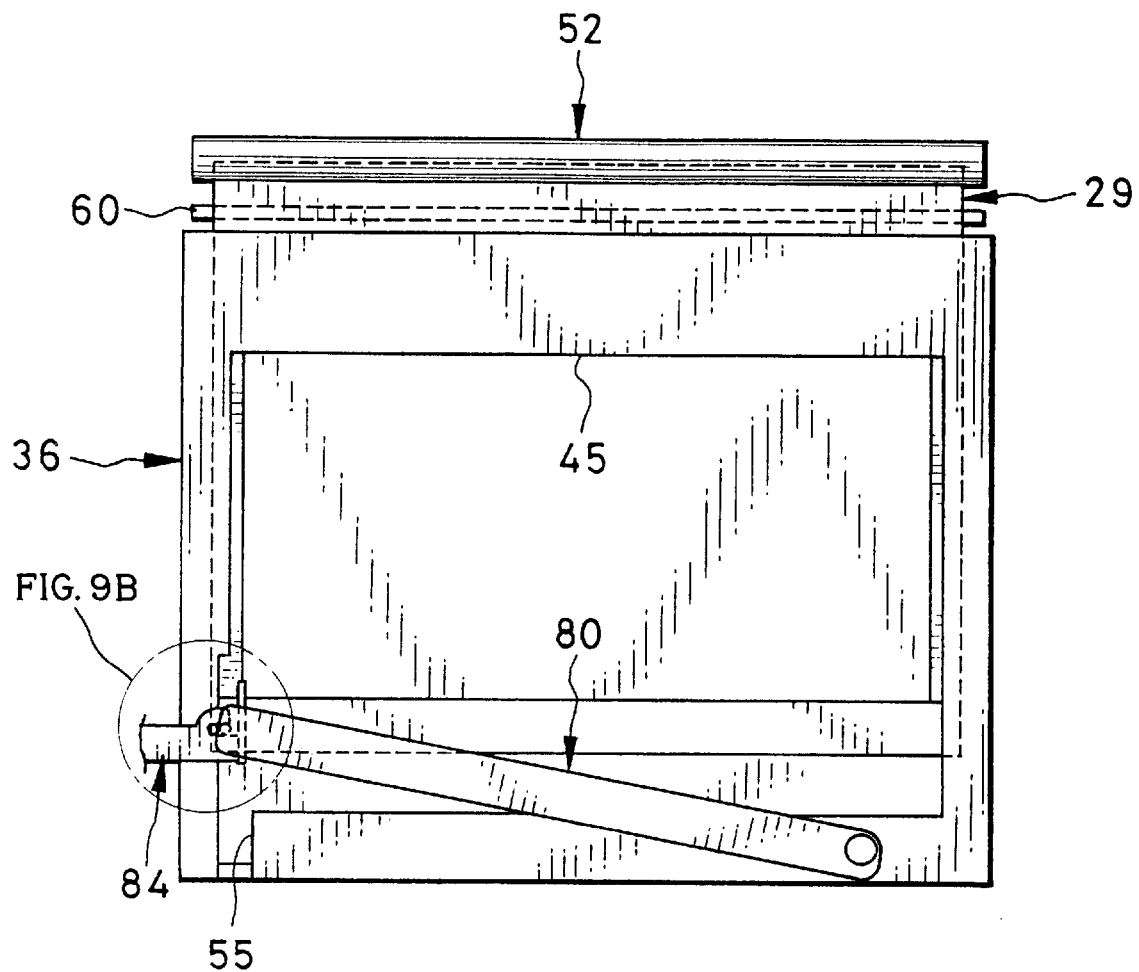
FIG. 9 is an explanatory view in front elevation, illustrating a state in which the blocking lever plate is swung.
Figure 9B:
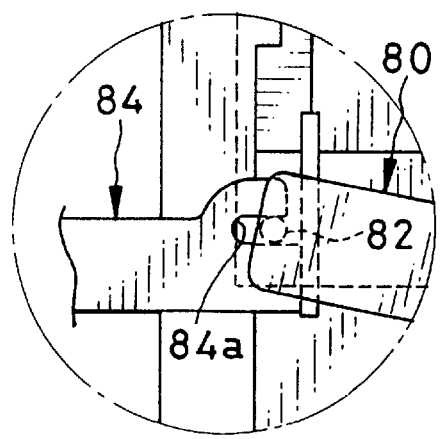
Figure 10:
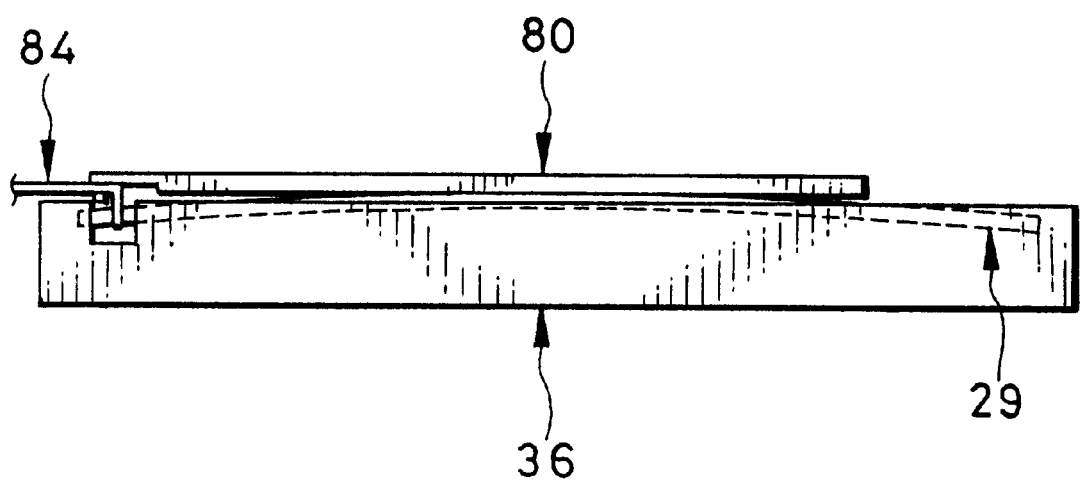
FIG. 10 is a bottom plan illustrating the blocking lever plate.

In FIG. 9, the claw member 84 of the advancing mechanism pushes up the one photo film unit 29. As the end pin 82 is engaged with the slit 84a of the claw member 84, the blocking lever plate 80 is swung about a pivot at the screw 81, and enters the region of the exposure opening 45. In FIG. 10, the blocking lever plate 80 contacts the bottom edge of the one photo film unit 29, and avoids flexing of the bottom edge of the one photo film unit 29 in the direction into the exposure opening 45 even upon contact with the spreading control plate 60.

In FIGS. 11 and 12, a preferred embodiment is depicted, in which pack support projections 88 contact the instant photo film pack 36. The rearmost ends of the pack support projections 88 are positioned in the rearward direction from the rear surface of the blocking lever plate 80 with a difference H in the level. Thus the pack support projections 88 position the instant photo film pack 36 away from the blocking lever plate 80 behind the light-shielding tunnel 38. There occurs no application of pressure from the blocking lever plate 80 to the instant photo film pack 36.

In the above embodiments, the instant camera is loaded with the photo film pack. However a printer may be loaded with the photo film pack of the present invention. In the above embodiment, the photo film units 29 are the transmission type, in which the exposure surface to be exposed is different from the positive image creating surface where the positive image is created. However the photo film units 29 can be the reflection type, in which the surface to be exposed is the same as a surface where the positive image is created.

In the embodiment of FIGS. 7–13, the blocking lever plate 80 is movable in response to movement of the claw member 84. Furthermore, an extension plate may be used instead of the blocking lever plate 80, and may be disposed as an extension of the claw member 84 in the direction crosswise to the advancing direction of the photo film units 29 without rotatable construction. It is possible for such an extension plate to block a corner part of the exposure opening 45 around the claw member 84 when the claw member 84 operates for the advance.

Note that it is possible to use the blocking lever plate 80 in an instant camera not having the spreading control plate 60. If the self-developing photo film unit is provided with a reduced thickness, its rigidity is so small that its edge at the trapping portion may be deformed by the ejecting claw moving in the advancing direction. But the blocking lever plate 80 is effective in preventing the deformation of the edge of the photo film unit at the trapping portion.

In the above embodiments, the photo film pack is oriented vertically when used with the instant camera. However the photo film pack when used in an optical instrument may be oriented in any direction in the present invention, for example horizontally, so that a relevant optical instrument such as an instant camera may have an exit in its front, and that the photo film units may be advanced forwards out of the camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant photo film pack loadable in a camera, including a box-shaped pack and plural stacked self-developing photo film units of a mono-sheet type contained therein, said pack including an upper wall having an exposure opening for providing said photo film units with an exposure, and a front wall having an exit slot for exiting said photo film units, said photo film units having a developing solution pod for containing developing solution along an advancing edge thereof, wherein a bottom edge of each one of said photo film units is pushed by an ejecting mechanism after said exposure to advance said advancing edge through said exit slot, said each one photo film unit is contacted by a spreading control member while moved to a pair of spreader rollers, said developing solution pod is squeezed and torn upon passage between said spreader rollers to spread said developing solution in said each one photo film unit, said instant photo film pack being characterized in that:

said bottom edge of said each one photo film unit comes to said exposure opening later than said advancing edge comes in contact with said spreading control member upon pushing of said each one photo film unit inside said pack, so that said bottom edge is prevented from being deformed in contact with said ejecting mechanism.

2. An instant photo film pack as defined in claim 1, wherein a distance between said advancing and bottom edges of said photo film units is longer than a distance between said spreading control member and an inner edge of said exposure opening closer to said bottom edge.

3. An instant photo film pack as defined in claim 2, wherein a ratio of a horizontal size of said photo film units to a vertical size thereof is 1.1–2.

4. A camera loadable with an instant photo film pack which contains plural stacked self-developing photo film units in a pack thereof, said camera including an exposure mechanism for providing each one of said photo film units with an exposure through an exposure opening in an upper wall of said pack, a spreading control member disposed close to a front wall of said pack, a pair of spreader rollers disposed downstream from said spreading control member, an ejecting mechanism for pushing a bottom edge of said each one photo film unit so as to move an advancing edge of said each one photo film unit to said spreader rollers, wherein said spreading control member regulates a thickness of developing solution in a regular manner by contacting said each one photo film unit being exposed and exited from an exit slot, said spreader rollers squeeze and tear a developing solution pod along said advancing edge of said each one photo film unit upon passage therebetween, to spread developing solution in said each one photo film unit, said camera being characterized in that:

said bottom edge of said each one photo film unit comes to said exposure opening later than said advancing edge comes in contact with said spreading control member upon pushing of said each one photo film unit inside said pack, so that said bottom edge is prevented from being deformed in contact with said ejecting mechanism.

5. A camera as defined in claim 4, wherein a distance between said spreading control member and an inner edge of said exposure opening closer to said bottom edge is shorter than a distance between said advancing and bottom edges of said photo film units.

6. A camera loadable with an instant photo film pack which contains plural stacked self-developing photo film units in a pack thereof, said camera including an exposure mechanism for providing each one of said photo film units with an exposure through an exposure opening in an upper wall of said pack, a spreading control member disposed close to a front wall of said pack, a pair of spreader rollers disposed downstream from said spreading control member, an ejecting mechanism for pushing a bottom edge of said each one photo film unit so as to move an advancing edge of said each one photo film unit to said spreader rollers, wherein said spreading control member regulates a thickness of developing solution in a regular manner by contacting said each one photo film unit being exposed and exited from an exit slot, said spreader rollers squeeze and tear a developing solution pod along said advancing edge of said each one photo film unit upon passage therebetween, to spread developing solution in said each one photo film unit, said camera comprising:

a blocking mechanism for preventing said bottom edge of said each one photo film unit from deformation in contact with said ejecting mechanism when said advancing edge comes in contact with said spreading control member in exiting of said each one photo film unit from said pack.

7. A camera as defined in claim 6, wherein said blocking mechanism moves into said exposure opening in response to movement of said ejecting mechanism, for preventing said bottom edge of said each one photo film unit from curving in said exposure opening.

8. A camera as defined in claim 7, said blocking mechanism includes a blocking plate movable into and out of said exposure opening, and having first and second ends, said first end being connected with a claw member of said ejecting mechanism, and said second end being secured to a shaft in a pivotally movable manner.

9. A camera as defined in claim 8, wherein said shaft is disposed in a direction opposite to said claw member with reference to a center line in an advancing direction of said photo film units.

10. A camera as defined in claim 9, further comprising a pack chamber loadable with said instant photo film pack, an opening formed in a front wall of said pack chamber and positioned at said exposure opening, and plural support projections disposed to project from said front wall;

wherein said support projections support said upper wall of said pack away from said front wall of said pack chamber, and said blocking plate has a thickness smaller than a height of said support projections so as to lie away from said upper wall of said pack.

11. In combination, an instant photo film pack and an optical instrument loadable therewith;

said instant photo film pack including a box-shaped pack and self-developing photo film units of a mono-sheet type;

said pack including an upper wall, a lower wall, a front wall, a rear wall and two lateral walls, said upper wall having an exposure opening, said front wall having an exit slot;

each one of said photo film units being contained in said pack with an exposure surface thereof directed to said upper wall, and having an advancing edge portion and a bottom edge portion, said advancing edge portion including a developing solution pod for containing developing solution, and said bottom edge portion including a trapping portion for trapping a surplus part of said developing solution;

said optical instrument including an exposure mechanism for providing each one of said photo film units with an exposure through said exposure opening of said pack, a spreading control member disposed close to said exit slot of said pack, a pair of spreader rollers disposed downstream from said spreading control member, wherein said spreading control member regulates a thickness of said developing solution in a regular manner by contacting said each one photo film unit being exposed and exited from an exit slot with said front end advanced, said spreader rollers squeeze and tear said developing solution pod along said advancing edge portion of said each one photo film unit upon passage therebetween, to spread said developing solution in said each one photo film unit;

wherein said photo film units, said exposure opening, and said spreading control member satisfy a condition of:

$$D \leq F$$

where D is a moving amount of said each one photo film unit moving from an initial position to a position where said advancing edge portion of said each one photo film unit contacts said spreading control member; and F is a distance between an inner edge portion of said exposure opening positioned close to said rear wall and said bottom edge portion of said each one photo film unit.

12. A combination as defined in claim 11, wherein said optical instrument is an instant camera.

13. A combination as defined in claim 12, wherein a ratio of a horizontal size of said photo film units to a vertical size thereof is 1.1–2.

14. A combination as defined in claim 12, wherein said each one of photo film units has a back surface reverse to said exposure surface, and is advanced while contacted frictionally by said spreading control member.

15. A combination as defined in claim 14, wherein said instant camera further includes a claw member for pushing said bottom edge portion of said each one photo film unit so as to move said advancing edge portion of said each one photo film unit to said spreader rollers.

16. A camera loadable with an instant photo film pack which contains a plural stacked self-developing photo film units in a pack thereof, said camera including an exposure mechanism for providing each one of said photo film units with an exposure through an exposure opening in an upper wall of said pack, a pair of spreader rollers, an ejecting mechanism for pushing a bottom edge of said each one photo film unit so as to move an advancing edge of said each one photo film unit to said spreader rollers, wherein said spreader rollers squeeze and tear a developing solution pod along said advancing edge of said each one photo film unit upon passage therebetween, to spread developing solution in said each one photo film unit, said camera comprising:

a blocking plate, movable into said exposure opening in response to movement of said ejecting mechanism, for preventing said bottom edge of said each one photo film unit from deformation in contact with said ejecting mechanism and from curving in said exposure opening.

\* \* \* \* \*